US010629927B2

(12) United States Patent
Toida et al.

(10) Patent No.: US 10,629,927 B2
(45) Date of Patent: Apr. 21, 2020

(54) FUEL CELL SYSTEM AND METHOD FOR DISCHARGING FLUID IN THE SYSTEM

(71) Applicant: TOYOTA JIDOSHA KABUSHIKI KAISHA, Toyota-shi, Aichi-ken (JP)

(72) Inventors: Masashi Toida, Nagoya (JP); Yoshiaki Naganuma, Toyota (JP); Tomohiro Ogawa, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 281 days.

(21) Appl. No.: 14/940,659

(22) Filed: Nov. 13, 2015

(65) Prior Publication Data
US 2016/0141672 A1    May 19, 2016

(30) Foreign Application Priority Data

Nov. 14, 2014 (JP) .................................. 2014-231449

(51) Int. Cl.
*H01M 8/04291* (2016.01)
*H01M 8/04746* (2016.01)
(Continued)

(52) U.S. Cl.
CPC ..... *H01M 8/04291* (2013.01); *H01M 8/0432* (2013.01); *H01M 8/04097* (2013.01);
(Continued)

(58) Field of Classification Search
CPC ............... H01M 8/04; H01M 8/04291; H01M 8/04402; H01M 8/04097; H01M 8/04201;
(Continued)

(56) References Cited

U.S. PATENT DOCUMENTS

2003/0118882 A1* 6/2003 Voss .................. H01M 8/04082
429/432
2003/0232226 A1* 12/2003 Morishima ....... H01M 8/04029
429/413
(Continued)

FOREIGN PATENT DOCUMENTS

JP     2005-158426 A    6/2005
JP     2006-331674 A    12/2006
(Continued)

OTHER PUBLICATIONS

Sauder (University of Waterloo Thesis 2009 taken as December, Effect of Anode Purge on Polymer Electrolyte Membrane Fuel cell Performance).*

(Continued)

*Primary Examiner* — Jonathan G Leong
*Assistant Examiner* — Aaron J Greso
(74) *Attorney, Agent, or Firm* — Finnegan, Henderson, Farabow, Garrett & Dunner, LLP

(57) ABSTRACT

There is provided a fuel cell system, wherein a controller configured to set the flow volume of a fluid in an anode flow path at an outlet of an anode of the fuel cell to a first flow volume, then set thereafter the flow volume of the fluid in the anode flow path at the outlet of the anode to a second flow volume which is smaller than the first flow volume, and discharge the water in the hydrogen discharge flow path by opening an exhaust and drain valve while the fluid is flowing at the second flow volume.

14 Claims, 3 Drawing Sheets

(51) Int. Cl.
*H01M 8/04223* (2016.01)
*H01M 8/04089* (2016.01)
*H01M 8/04082* (2016.01)
*H01M 8/0432* (2016.01)
*H01M 8/0438* (2016.01)

(52) U.S. Cl.
CPC ... *H01M 8/04201* (2013.01); *H01M 8/04253* (2013.01); *H01M 8/04402* (2013.01); *H01M 8/04753* (2013.01); *H01M 8/04761* (2013.01)

(58) Field of Classification Search
CPC ............ H01M 8/0432; H01M 8/4761; H01M 8/04253; H01M 8/04753
See application file for complete search history.

(56) References Cited

U.S. PATENT DOCUMENTS

| | | | | |
|---|---|---|---|---|
| 2004/0058211 | A1* | 3/2004 | Tachtler | H01M 8/04089 429/430 |
| 2005/0074641 | A1* | 4/2005 | Inai | H01M 8/04231 429/429 |
| 2009/0110981 | A1* | 4/2009 | Saito | H01M 8/04089 429/411 |
| 2009/0148728 | A1 | 6/2009 | Fujita | |
| 2010/0098980 | A1 | 4/2010 | Ishikawa | |
| 2010/0112404 | A1 | 5/2010 | Yamagishi et al. | |
| 2010/0227238 | A1 | 9/2010 | Naganuma | |
| 2011/0217611 | A1* | 9/2011 | Okuyoshi | H01M 8/045 429/429 |
| 2011/0302993 | A1* | 12/2011 | Kuebel | G01D 18/00 73/23.31 |
| 2012/0171590 | A1* | 7/2012 | Matsumoto | H01M 8/04253 429/442 |
| 2013/0295475 | A1* | 11/2013 | Forte | H01M 8/04156 429/414 |

FOREIGN PATENT DOCUMENTS

| | | | | |
|---|---|---|---|---|
| JP | 2007-305563 | | 11/2007 | |
| JP | 2008-084603 | A | 4/2008 | |
| JP | 2006-147440 | * | 6/2008 | ............. H01M 8/04 |
| JP | 2009-004180 | * | 6/2008 | ............. H01M 8/04 |
| KR | 10-1035319 | B1 | 5/2011 | |

OTHER PUBLICATIONS

Engineering Toolbox Solubility of Gases in Water online Feb. 11, 2007 Wayback.pdf.*
JP 2009-004180 Englsih Machine translation With DERWENT Abstract 2009.*

* cited by examiner

US 10,629,927 B2

FUEL CELL SYSTEM AND METHOD FOR DISCHARGING FLUID IN THE SYSTEM

BACKGROUND

Field

The present disclosure relates to a fuel cell system and a method for discharging a fluid in the system.

Background Art

In the process of generating power, an impurity, such as nitrogen or carbon monoxide, or water accumulates inside a fuel cell system or a circulation flow path of a fuel off-gas. In order to discharge the impurities or water to the outside, a technique known as a purge technique has been used, in which an exhaust and drain valve is provided in a drain flow path connected to a circulation flow path, and the opening/closing of the exhaust and drain valve is controlled so as to discharge gases or water in the circulation flow path at each predetermined time.

Further, in order to secure the startup performance of a fuel cell system in a subfreezing environment, preventive measures have been taken to discharge the water or the like accumulated in a flow path on an anode side through an exhaust and drain valve by making use of a pressure difference immediately before the temperature of a component (e.g. the foregoing exhaust and drain valve) constituting the fuel cell system reaches zero degrees Celsius (see, for example, JP2007-305563A).

However, there is a case where, although the water around the exhaust and drain valve is discharged by making use of a pressure difference as described above, the water still remains on the side of a fuel cell stack, so that the water flows out from the fuel cell stack at the time of exhaust, causing inadequate drainage around the exhaust and drain valve. The inadequate drainage treatment poses a problem that, for example, the remaining water freezes in a subfreezing environment, causing a failure to secure the startup performance.

SUMMARY

Accordingly, an object of the present disclosure is to provide a fuel cell system and a method for discharging a fluid in the system which ensure an improved discharge treatment when a fluid discharge treatment is carried out, thereby restraining water from remaining in the system.

The present disclosure provides a fuel cell system including: a fuel cell; a hydrogen supply unit which supplies a hydrogen gas to the fuel cell; a hydrogen supply flow path, through which a hydrogen gas to be supplied from the hydrogen supply unit to the fuel cell passes; a hydrogen discharge flow path, through which a hydrogen off-gas discharged from the fuel cell passes; an exhaust and drain valve disposed in the hydrogen discharge flow path; and a controller configured to control the supply amount of the hydrogen gas from the hydrogen supply unit,
wherein the controller is further configured to:
set a flow volume of a fluid in an anode flow path at an outlet of an anode of the fuel cell to a first flow volume;
thereafter, set the flow volume of the fluid in the anode flow path at the outlet of the anode to a second flow volume that is smaller than the first flow volume, and
discharges water in the hydrogen discharge flow path by opening the exhaust and drain valve while the fluid is flowing at the second flow volume.

According to the present disclosure, when discharging the fluid, the fluid existing in the flow path on the anode side is passed at the first flow volume first, thereby discharging the water in the flow path on the anode side of a fuel cell stack. Thereafter, the water at the anode outlet or the like of the fuel cell stack is passed at the second flow volume, which is smaller than the first flow volume, thus discharging the water in the flow path through the exhaust and drain valve. As described above, providing the difference in purge flow volume during the drainage treatment by using a hydrogen pump or the like of the circulation flow path makes it possible to prevent the water from moving from an upstream side of the system to a downstream side of the system so as to prevent the water from remaining at the downstream side of the system.

The hydrogen supply unit may include a fuel tank in which the hydrogen gas is stored; an injector provided in the hydrogen supply flow path; a circulation flow path which returns the hydrogen off-gas, which has been discharged from the fuel cell, from the hydrogen discharge flow path to the hydrogen supply flow path; and a hydrogen pump which pressure-feeds the hydrogen off-gas in the hydrogen discharge flow path to the hydrogen supply flow path through the circulation flow path.

In the foregoing fuel cell system, after the fluid passes at the first flow volume, the flow volume of the fluid in the anode flow path at the outlet of the anode may be set at a third flow volume, which is smaller than the first flow volume but larger than the second flow volume. In this case, passing the fluid at the third flow volume makes it possible to drain beforehand the water accumulated in the vicinity of the anode outlet in the fuel cell stack, thus further suppressing the water from remaining around the exhaust and drain valve.

The controller may carry out an exhaust of the flow path on the anode side in the case where it is determined that a temperature of a constituent component of the fuel cell will reach zero degrees Celsius. In this case, the startup performance of the fuel cell system in a subfreezing environment can be secured by draining the water in the flow path on the anode side or the like before freezing. The constituent component is, for example, the foregoing exhaust and drain valve.

The present disclosure provides a method for discharging a fluid in a fuel cell system out of the fuel cell system, the method comprising: a fuel cell; a fuel tank storing a hydrogen gas to be supplied to the fuel cell; a hydrogen supply flow path, through which the hydrogen gas to be supplied from the fuel tank to the fuel cell passes; a circulation flow path which returns a hydrogen off-gas discharged from the fuel cell to the hydrogen supply flow path; a hydrogen pump which pressure-feeds the hydrogen off-gas in the circulation flow path to the hydrogen supply flow path; a gas-liquid separator disposed in the circulation flow path; an exhaust and drain valve provided in the gas-liquid separator; and a controller which controls the hydrogen pump, the method further comprising the steps of:
passing a fluid existing in a flow path on an anode side in the fuel cell at a first flow volume by the hydrogen pump;
thereafter, passing the fluid thereafter at a second flow volume which is smaller than the first flow volume by the hydrogen pump; and
opening the exhaust and drain valve while the fluid is being passed at the second flow volume, thereby discharging water in the circulation flow path.

The method for discharging a fluid in a fuel cell system out of the fuel cell system may further comprising the step of setting the flow volume of the fluid in the anode flow path at the outlet of the anode to a third flow volume, which is smaller than the first flow volume but larger than the second flow volume, after the fluid passes through the anode flow path at the first flow volume.

The method for discharging a fluid in a fuel cell system out of the fuel cell system may further comprise a step of carrying out an exhaust of the flow path on the anode side in the case where the controller determines that a temperature of a constituent component of the fuel cell system will decrease to zero degrees Celsius.

DESCRIPTION OF THE PREFERRED EMBODIMENTS

The following will describe in detail the configuration of the present disclosure in connection with an embodiment illustrated in the accompanying drawings. In the following description, the general configuration of a fuel cell system 1 will be first described, and then a fluid discharge treatment in the fuel cell system 1 will be described.

Figure 1:
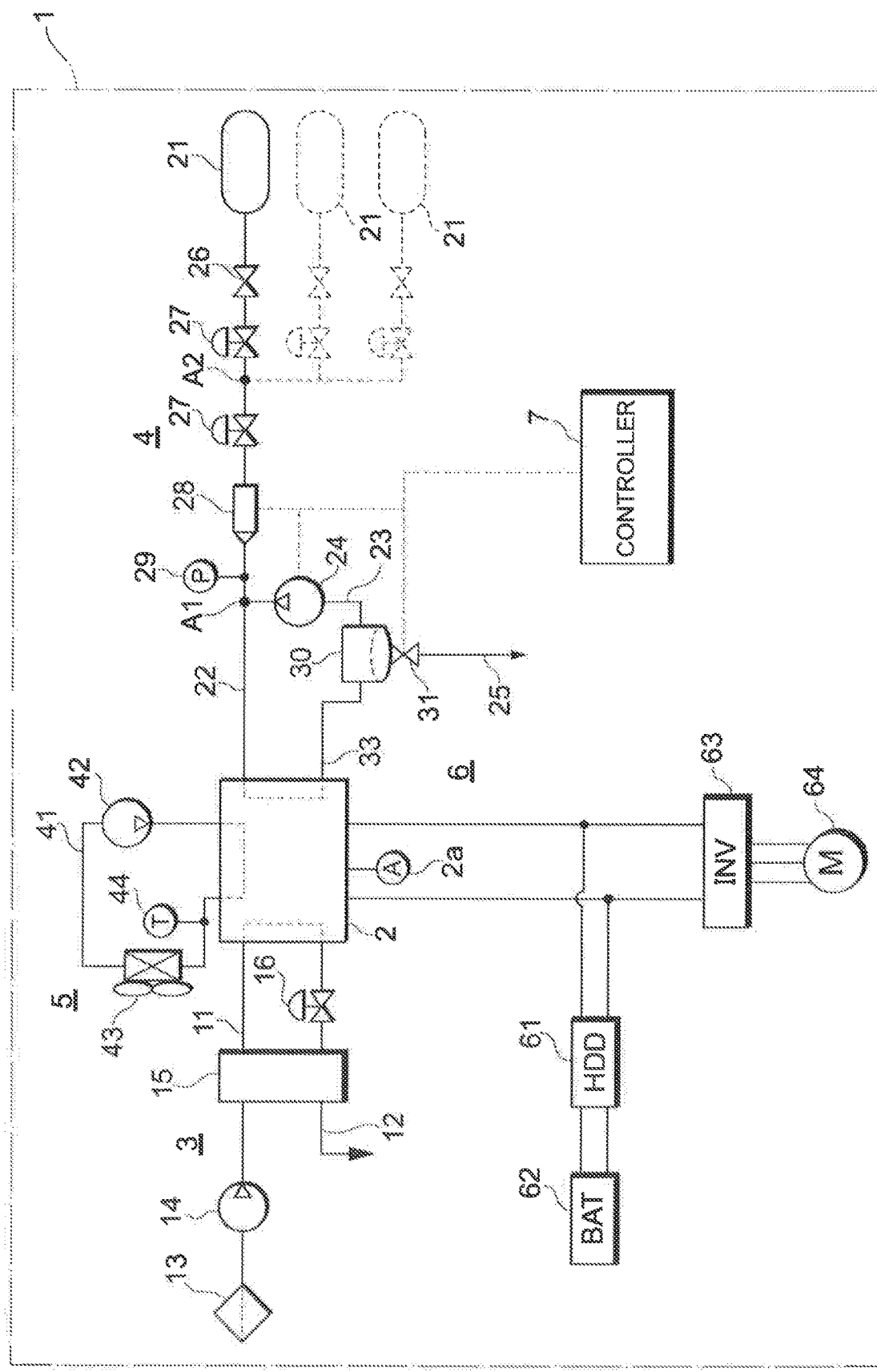
FIG. 1 is a diagram illustrating the schematic configuration of a fuel cell system.
Figure 2:
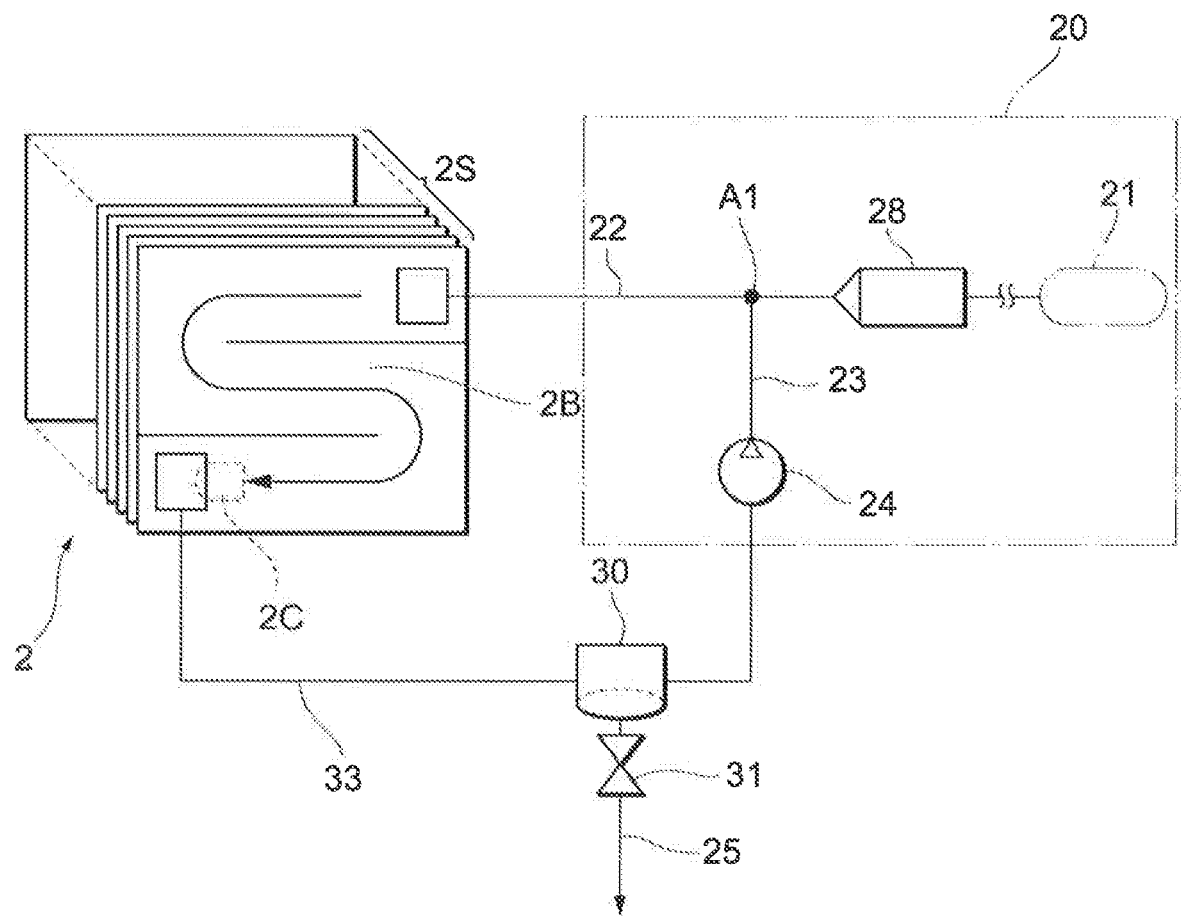
FIG. 2 is a diagram illustrating the schematic configuration of a circulation flow path of a hydrogen off-gas in the fuel cell system.

FIG. 1 illustrates the schematic configuration of a fuel cell system 1 mounted on a fuel cell hybrid vehicle, and FIG. 2 illustrates the schematic configuration of the circulation flow path of a hydrogen off-gas. It should be noted that, although the description will be given of an example of the system applicable as an in-vehicle power generation system of a fuel cell hybrid vehicle, the fuel cell system 1 can be used also as a power generation system mounted on a variety of types of mobile bodies, such as ships and aircrafts, or self-propelled machines, such as robots, or can be also used as a stationary power generation system.

The fuel cell system 1 in the present embodiment includes a fuel cell 2, which receives the supply of reactant gases (an oxidizing gas and a fuel gas) and generates power by an electrochemical reaction, an oxidizing gas piping system 3, which supplies air serving as the oxidizing gas to the fuel cell 2, a fuel gas piping system 4, which supplies a hydrogen gas serving as a fuel gas to the fuel cell 2, a refrigerant piping system 5, which supplies a refrigerant to the fuel cell 2 to cool the fuel cell 2, a power system 6, which carries out the charge/discharge of the power of the system, and a controller 7, which integrally controls the entire system.

The fuel cell 2 is, for example, a solid polyelectrolyte type fuel cell composed of a large number of stacked unit cells (the fuel cell stack in FIG. 2 being denoted by a reference character 2S). Each of the unit cells has an air electrode on one surface of an electrolyte composed of an ion-exchange membrane, a fuel electrode on the other surface, and a pair of separators sandwiching the air electrode and the fuel electrode from both sides. The fuel gas is supplied to a fuel gas passage of one separator, while the oxidizing gas is supplied to an oxidizing gas passage of the other separator, and the reactant gases produce a chemical reaction, thus generating power. The fuel cell 2 is provided with a current sensor 2a, which detects the current in the process of power generation.

The oxidizing gas piping system 3 has an air supply flow path 11, through which the oxidizing gas to be supplied to the fuel cell 2 passes, and an exhaust flow path 12, through which the oxidizing off-gas discharged from the fuel cell 2 passes. The air supply flow path 11 is provided with a compressor 14, which draws in the oxidizing gas through a filter 13, and a humidifier 15, which humidifies the oxidizing gas pressure-fed by the compressor 14. The compressor 14 takes in the oxidizing gas from the atmosphere by driving a motor (not illustrated). Further, the oxidizing off-gas flowing through the exhaust flow path 12 passes through a back-pressure regulator 16 and is subjected to moisture exchange in the humidifier 15 before being eventually exhausted out of the system as an exhaust gas into the atmosphere.

The fuel gas piping system 4 has fuel tanks 21 serving as hydrogen supply sources, a hydrogen supply flow path 22, through which the hydrogen gas supplied from the fuel tanks 21 to the fuel cell 2 passes, a hydrogen supply unit 20, which supplies the hydrogen gas to the fuel cell 2, a hydrogen discharge flow path 33, through which the hydrogen off-gas (fuel off-gas) discharged from the fuel cell 2 passes, a circulation flow path 23 for returning the hydrogen off-gas to a merging section A1 of the hydrogen supply flow path 22, a hydrogen pump 24, which pressure-feeds the hydrogen off-gas that has passed through the hydrogen discharge flow path 33 to the hydrogen supply flow path 22, and an exhaust and drain flow path 25 branched and connected to the circulation flow path 23.

The hydrogen supply unit 20 includes the fuel tanks 21 storing the hydrogen gas, an injector 28 provided in the hydrogen supply flow path 22, the circulation flow path 23 for returning the hydrogen off-gas, which has been discharged from the fuel cell 2, from the hydrogen discharge flow path 33 to the hydrogen supply flow path 22, and the hydrogen pump 24 for pressure-feeding the hydrogen off-gas in the hydrogen discharge flow path 33 to the hydrogen supply flow path 22 through the circulation flow path 23 (refer to FIG. 2).

Each of the fuel tanks 21 is composed of, for example, a high-pressure tank or a hydrogen storing alloy and configured to be capable of storing a hydrogen gas of, for example, 35 MPa or 70 MPa, the plurality of the fuel tanks 21 being mounted on the fuel cell hybrid vehicle in the present embodiment. When a shutoff valve 26, which will be discussed later, is opened, the hydrogen gas flows out of the fuel tanks 21 to the hydrogen supply flow path 22. The pressure of the hydrogen gas is eventually reduced to, for example, approximately 200 kPa by a regulator 27 or the injector 28, which will be discussed later, before the hydrogen gas is supplied to the fuel cell 2. The fuel tanks 21 serve as the hydrogen supply sources in the present embodiment. Alternatively, however, the hydrogen supply source can be constituted by a reformer that generates a hydrogen-rich reformed gas from a hydrocarbon-based fuel and a high-pressure gas tank that accumulates the reformed gas, which has been generated by the reformer, in a high pressure state.

The hydrogen supply flow path 22 is provided with the shutoff valve 26, which shuts off or allows the supply of the hydrogen gas from the fuel tanks 21, the regulator 27, which regulates the pressure of the hydrogen gas, and the injector 28. Further, a pressure sensor 29, which detects the pressure of the hydrogen gas in the hydrogen supply flow path 22, is provided on the downstream side of the injector 28 but on the upstream side of the merging section A1, at which the hydrogen supply flow path 22 and the circulation flow path 23 merge. Further, a pressure sensor and a temperature sensor (not illustrated), which detect the pressure and the temperature, respectively, of the hydrogen gas in the hydrogen supply flow path 22, are provided on the upstream side of the injector 28. The information on the gas state (the pressure and temperature) of the hydrogen gas detected by the pressure sensor 29 and the like is used in the feedback control or the purge control of the injector 28, which will be discussed later.

The regulator 27 is a device that regulates the pressure on the upstream side thereof (a primary pressure) to a predetermined secondary pressure. In the present embodiment, a mechanical type pressure reducing valve which reduces the primary pressure is adopted as the regulator 27. The mechanical type pressure reducing valve may adopt a publicly known configuration having a chassis, in which a back-pressure chamber and a pressure regulation chamber are partitioned by a diaphragm. A primary pressure is reduced to a predetermined pressure in the pressure regulation chamber by the back pressure in the back-pressure chamber, thereby providing a secondary pressure.

The injector 28 is an electromagnetically driven on-off valve capable of regulating the gas flow volume or the gas pressure by directly driving a valve element by an electromagnetic driving force at a predetermined drive cycle so as to detach the valve element from a valve seat. The injector 28 includes a valve seat having an jet hole through which a gaseous fuel, such as a hydrogen gas, is injected, a nozzle body which supplies and guides the gaseous fuel to the jet hole, and a valve element which is movably housed and held in an axial direction (a gas flow direction) relative to the nozzle body and which opens or closes the jet hole. For example, the valve element of the injector 28 in the present embodiment is driven by a solenoid, which is an electromagnetic drive device, and the adjustment of the opening area of the jet hole can be switched to a two-stage, a multiple-stage or a non-stage mode by turning on or off a pulsed excitation current fed to the solenoid. Further, the gas injection time and the gas injection timing of the injector 28 are controlled according to control signals output from the controller 7, thereby controlling the flow volume and the pressure of the hydrogen gas with high accuracy. Thus, the valve assembly (the valve element and the valve seat) of the injector 28 is directly driven to be opened or closed by the electromagnetic driving force, and the drive cycle can be controlled to a high response range, exhibiting high responsiveness.

The gas flow volume is regulated by opening or closing the valve element of the injector 28, and the pressure of the gas supplied to the downstream side of the injector 28 is reduced to be lower than the gas pressure on the upstream side of the injector 28, so that the injector 28 may be interpreted as a pressure regulation valve (a pressure reducing valve or a regulator). Further, in the present embodiment, the injector 28 may be interpreted also as a variable pressure regulation valve capable of changing the pressure regulation amount (the pressure reduction amount) of the gas pressure on the upstream side of the injector 28 such that a required pressure is obtained within a predetermined pressure range according to a gas requirement.

In the present embodiment, the injector 28 described above is disposed on the upstream side of the merging section A1, at which the hydrogen supply flow path 22 and the circulation flow path 23 merge (refer to FIG. 1). Further, if a plurality of the fuel tanks 21 is used as the fuel supply source, as indicated by the dashed lines in FIG. 1, then the injector 28 is disposed on the downstream side of the merging section of the hydrogen gases supplied from the fuel tanks 21 (a hydrogen gas merging section A2).

The exhaust and drain flow path 25 is connected to the circulation flow path 23 via a gas-liquid separator 30 and an exhaust and drain valve 31. The gas-liquid separator 30 is adapted to collect water from the hydrogen off-gas. The exhaust and drain valve 31 is actuated in response to a command from the controller 7 to discharge (purge) the water collected by the gas-liquid separator 30 and the hydrogen off-gas (the fuel off-gas) containing impurities out of the circulation flow path 23. Releasing the exhaust and drain valve 31 causes a reduction in the concentration of the impurities in the hydrogen off-gas in the circulation flow path 23 and causes an increase in the concentration of the hydrogen in the hydrogen off-gas circulated and supplied.

Although not specifically illustrated in detail, the hydrogen off-gas discharged through the exhaust and drain valve 31 and the exhaust and drain flow path 25 is diluted by a diluter (not illustrated) and then merges with the oxidizing off-gas in the exhaust flow path 12. The hydrogen pump 24 is driven by a motor (not illustrated) to circulate and supply the hydrogen gas in the circulation system to the fuel cell 2. The circulation system of the hydrogen gas is constituted of the flow path on the downstream side of the merging section A1 of the hydrogen supply flow path 22, the fuel gas passage formed in the separators of the fuel cell 2, and the circulation flow path 23.

The refrigerant piping system 5 has a refrigerant flow path 41 in communication with the refrigerant flow path in the fuel cell 2, a cooling pump 42 provided in the refrigerant flow path 41, a radiator 43, which cools the refrigerant discharged from the fuel cell 2, and a temperature sensor 44, which detects the temperature of the refrigerant discharged from the fuel cell 2. The cooling pump 42 is driven by a motor (not illustrated) to circulate and supply the refrigerant in the refrigerant flow path 41 to the fuel cell 2. The temperature of the refrigerant detected by the temperature sensor 44 (i.e. the temperature of the hydrogen off-gas discharged from the fuel cell 2) is used for the purge control, which will be discussed later.

The power system 6 mainly includes a high-voltage DC-DC converter 61, a battery 62, a traction inverter 63, a traction motor 64, and various types of auxiliary inverters (not illustrated). The high-voltage DC-DC converter 61 is a DC voltage converter, which has a function for adjusting a DC voltage received from the battery 62 and outputting the adjusted DC voltage to the traction inverter 63, and a function for adjusting a DC voltage received from the fuel cell 2 or the traction motor 64 and outputting the adjusted DC voltage to the battery 62. The battery 62 is charged and discharged by these functions of the high-voltage DC-DC converter 61. Further, the output voltage of the fuel cell 2 is controlled by the high-voltage DC-DC converter 61.

The battery 62 is composed of a stack of battery cells having a predetermined high voltage as the terminal voltage thereof, and capable of charging surplus power or supplementarily supplying power under the control by a battery computer (not illustrated). The traction inverter 63 converts a DC current into a three-phase AC current, which is supplied to the traction motor 64. The traction motor 64 is, for example, a three-phase AC motor, and constitutes the main motive power source of the fuel cell hybrid vehicle on which the fuel cell system 1 is mounted.

The auxiliary inverter functions as a motor controller which controls the drive of each motor, and converts a DC current to a three-phase AC current, which is supplied to each motor. The auxiliary inverter is, for example, a pulse width modulation (PWM) inverter. According to a control command from the controller 7, the auxiliary inverter converts the DC voltage output from the fuel cell 2 or the battery 62 into the three-phase AC voltage and controls the rotation torque generated at each motor.

The controller 7 detects the manipulated variable of an acceleration control member (accelerator pedal or the like) provided in the vehicle, and controls the operations of various types of devices in the system upon receipt of control information, such as a required acceleration value (e.g. a required power generation amount from a load device, such as the traction motor 64). The load device may include, in addition to the traction motor 64, auxiliary devices necessary for operating the fuel cell 2 (e.g. the motors of the compressor 14, the hydrogen pump 24, and the cooling pump 42), the actuators used with various types of devices involved in the travel of the vehicle (a transmission, a wheel controller, a steering device, a suspension and the like), and power consuming devices, such as an air conditioning system (air conditioner), lighting and an audio in a passenger space.

The foregoing controller 7 is comprised of a computer system (not illustrated). The computer system includes a CPU, a ROM, a RAM, an HDD, an input/output interface, a display and the like. The CPU reads various control programs recorded in the ROM and carries out desired operations thereby to perform various types of processing and control, such as feedback control and purge control.

A description will now be given of the fluid discharge treatment in the foregoing fuel cell system 1. The following will describe the fluid discharge treatment in a parking purge, which is a purge treatment carried out immediately before the system reaches zero degrees Celsius or below after the operation of the system is stopped when the fuel cell hybrid vehicle stops. When carrying out the parking purge, the discharge efficiency can be improved by starting the discharge treatment after the movement of the water or dew condensation settles following the stop of the operation of the fuel cell system 1.

Figure 3:
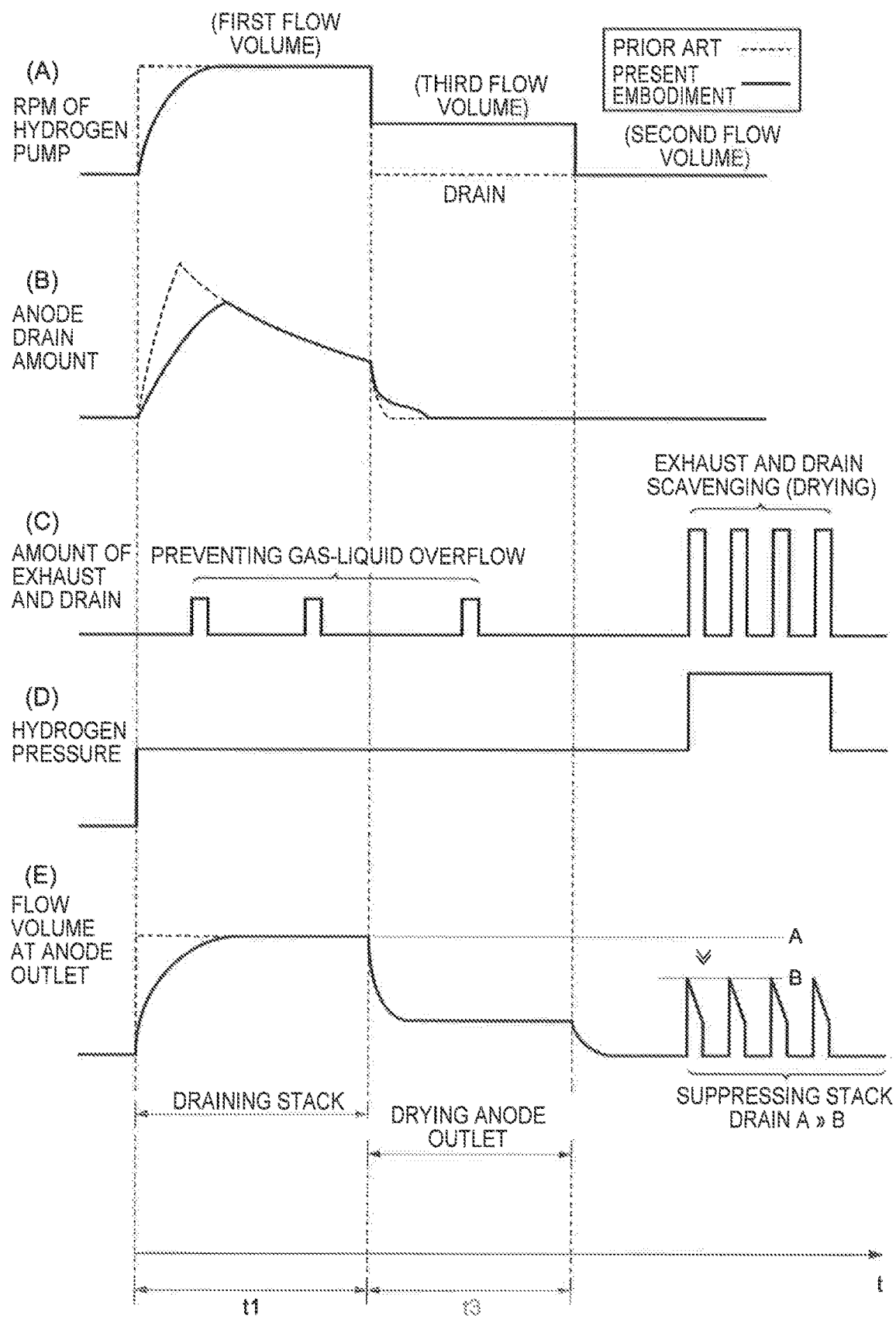
FIG. 3 presents graphs illustrating the time-dependent changes during a parking purge, wherein (A) illustrates the rpm of a hydrogen pump, (B) illustrates the drain amount at an anode, (C) illustrates the amount of exhaust and drain through an exhaust and drain valve, (D) illustrates the hydrogen gas pressure of an injector, and (E) illustrates the flow volume of a fluid at an anode outlet.

FIG. 3 presents graphs illustrating the time-dependent changes at the time of a parking purge, wherein (A) illustrates the rpm of the hydrogen pump 24, (B) illustrates the drain amount at an anode, (C) illustrates the amount of exhaust and drain through the exhaust and drain valve 31, (D) illustrates the hydrogen gas pressure of the injector 28, and (E) illustrates the flow volume of a fluid at the anode outlet.

<Stack Drain Step>

At the beginning of the parking purge, the controller 7 first operates a device, such as the hydrogen pump 24, constituting the hydrogen supply unit 20, for a predetermined time t1 while starting the hydrogen pump 24 up to a first rpm so as to pass the fluid, which exists in the flow path on the anode side of the fuel cell stack 2S, at the first flow volume. At this time, according to the present embodiment, the hydrogen pump 24 is operated such that the hydrogen pump 24 gradually increases the rpm over a certain time rather than instantaneously increasing the rpm to the first rpm (refer to FIG. 3(A)). Thus, gradually draining the water from the flow path on the anode side effectively prevents the gas-liquid separator 30 on the downstream side from overflowing. Further, gradually increasing the rpm is also effective for reducing noises.

As the fluid starts to be passed at the first flow volume, the drain amount at the anode (the drain amount through a flow path 2B on the anode side of the fuel cell 2) gradually increases until a peak value is reached, and then gradually decreases (refer to FIG. 2 and FIG. 3(B)). The term "the first flow volume" means a flow volume which is larger than "the second flow volume" (to be discussed later) required for discharging water from the fuel cell system 1 (refer to FIG. 3(A)). Using the flow volume that is larger than a normal flow volume at the beginning makes it possible to prevent the water in the fuel cell 2 from flowing to the exhaust and drain valve 31 when the exhaust and drain valve 31 is opened. This in turn makes it possible to suppress the water remaining around the exhaust and drain valve 31.

During the stack drain step, the exhaust and drain valve 31 is opened or closed as necessary (refer to FIG. 3(C)). This permits the overflow of discharged gas-liquid to be prevented.

During the parking purge treatment, the hydrogen gas pressure of the injector 28 is maintained at a high level (refer to FIG. 3(D)). This makes it possible to drain the gas-liquid separator 30 and prevent the overflow during the parking purge treatment.

During the stack drain step, the flow velocity of the fluid at an anode outlet (the section at which the fluid that has passes through the flow path 2B on the anode side is discharged through a manifold of the fuel cell stack 2S) 2C increases as the rpm of the hydrogen pump 24 increases and then maintains a predetermined flow velocity A before decreasing as the rpm of the hydrogen pump 24 decreases (refer to FIG. 3(E)).

<Step of Drain at the Anode Outlet and Drying Hydrogen Pump>

After the stack drain step described above (the predetermined time t1), the procedure proceeds to the step of draining at the anode outlet and drying hydrogen pump. In this step, the controller 7 decreases the rpm of the hydrogen pump 24 to a third rpm and operates the hydrogen pump 24 for a predetermined time t3 so as to pass the fluid at a third flow volume which is smaller than the foregoing first flow volume but larger than the second flow volume (refer to FIG. 3(A)).

Setting the flow volume during the parking purge treatment at the third flow volume as described above causes the anode drain amount to suddenly decrease temporarily, and then slowly reduces thereafter (refer to FIG. 3(B)). With this arrangement, the water accumulated in the vicinity of the anode outlet 2C, which tends to be a bottleneck of the flow path, is drained little by little over an extended time longer than that in the past. The drain in this manner permits further suppression of the water remaining around the exhaust and drain valve 31.

As the drain proceeds, the flow velocity of the fluid at the anode outlet 2C decreases (refer to FIG. 3(E)). Continuing to pass the fluid at the third flow volume thereafter causes the inside of the hydrogen pump 24 to gradually dry.

During the step of draining the anode outlet and drying the hydrogen pump, the exhaust and drain valve 31 is opened or closed as appropriate so as to prevent the overflow of the discharged gas-liquid (refer to FIG. 3(C)).

<Exhaust and Drain Valve Drying Step>

After the step of draining the anode outlet and drying the hydrogen pump (for the predetermined time t3) described above, the procedure proceeds to the step of drying the exhaust and drain valve 31. In this step, the controller 7 reduces the rpm of the hydrogen pump 24 to a second rpm so as to pass the fluid at the second flow volume, which is smaller than the foregoing third flow volume (refer to FIG. 3(A)).

Thereafter, with the exhaust and drain valve 31 opened, the opening/closing operation of the injector 28 is performed in a short time to carry out a scavenging treatment, thereby increasing the hydrogen gas pressure in pulses. This is repeated a few times in the present embodiment (refer to FIG. 3(D)). The scavenging treatment causes the amount of the exhaust and drain through the exhaust and drain valve 31 to instantaneously increase or decrease, expediting the drying of the exhaust and drain valve 31 (refer to FIG. 3(C)).

The scavenging treatment also causes the flow velocity of the fluid at the anode outlet 2C to change in pulses (refer to FIG. 3(E)). A flow velocity B, which is the maximum flow velocity value at this time, is extremely low, as compared with the flow velocity A in the foregoing stack drain step (A>>B). Hence, no water is drained from the flow path 2B on the anode side and therefore water no longer moves toward the anode outlet 2C.

As described above, according to the fluid discharge treatment in the present embodiment, when a fluid is discharged, the fluid existing in the flow path 2B on the anode side is first passed at the first flow volume so as to drain the water from flow path 2B on the anode side of the fuel cell stack 2S, and then the water mainly at the anode outlet 2C of the fuel cell stack 2S is passed at the second flow volume, which is smaller than the first flow volume, thereby draining the water in the flow path through the exhaust and drain valve 31. Thus, the hydrogen pump 24 of the circulation flow path 23 is used to create the difference in the purge flow volume at the time of the drainage treatment, thereby preventing water from moving from the upstream side to the downstream side of the fuel cell system 1. This makes it possible to prevent water from remaining on the downstream side of the system.

The embodiment described above is an example of a preferred embodiment of the present disclosure; however, the present disclosure is not limited thereto, and a variety of modifications can be made within the spirit and scope of the present disclosure. For example, although the foregoing embodiment describes the fluid discharge treatment (the purge treatment) carried out at each parking purge, this is merely one example, and it is obvious that the treatment can be carried out at other timings. For example, the fluid discharge treatment can be carried out also for simply draining the generated water accumulated in the flow path on the anode side.

Further, in the foregoing embodiment, the description has been given of the case where the rpm of the hydrogen pump 24 is changed to change the flow volume of the fluid. Alternatively, however, other device, such as the injector 28, constituting the hydrogen supply unit 20 may be used to change the flow volume of the fluid, rather than being limited to the hydrogen pump 24, insofar as the device is also capable of changing the flow volume of the fluid.

The present disclosure ensures an improved discharge treatment when carrying out a fluid discharge treatment, thus making it possible to restrain water from remaining in the system.

The present disclosure is ideally applied to a fuel cell system that may be started up in a subfreezing environment.

What is claimed is:

1. A fuel cell system comprising:
a fuel cell configured to perform a power generation operation;
a hydrogen supply unit which supplies a hydrogen gas to the fuel cell;
a hydrogen supply flow path, through which a hydrogen gas to be supplied from the hydrogen supply unit to the fuel cell passes;
a hydrogen discharge flow path, through which a hydrogen off-gas discharged from the fuel cell passes;
an exhaust and drain valve disposed in the hydrogen discharge flow path;
a circulation flow path which returns the hydrogen off-gas, which has been discharged from the fuel cell, from the hydrogen discharge flow path to the hydrogen supply flow path;
a hydrogen pump which pressure-feeds the hydrogen off-gas in the hydrogen discharge flow path to the hydrogen supply flow path through the circulation flow path; and
a controller programmed to control the supply amount of a hydrogen gas from the hydrogen supply unit, wherein when the fuel cell does not perform the power generation operation, the controller is further programmed to:
supply hydrogen gas to the fuel cell with the hydrogen pump to set a flow volume of a fluid in an anode flow path at an outlet of an anode of the fuel cell to a first flow volume;
supply hydrogen gas to the fuel cell with the hydrogen pump to set the flow volume of the fluid in the anode flow path at the outlet of the anode to a third flow volume, which is smaller than the first flow volume, after the fluid passes through the anode flow path at the first flow volume;
drive the hydrogen pump to supply hydrogen gas to the fuel cell until the fluid is not drained at the third flow volume of the fluid in the anode flow path at the outlet of the anode;
thereafter, supply hydrogen gas to the fuel cell with the hydrogen pump to set the flow volume of the fluid in the anode flow path at the outlet of the anode to a second flow volume that is smaller than the first flow volume and the third flow volume; and
discharge water in the hydrogen discharge flow path by opening the exhaust and drain valve while the fluid is passing at the second flow volume.

2. A fuel cell system comprising:
a fuel cell configured to perform a power generation operation;
a hydrogen supply unit which supplies a hydrogen gas to the fuel cell;
a hydrogen supply flow path, through which a hydrogen gas to be supplied from the hydrogen supply unit to the fuel cell passes;
a hydrogen discharge flow path, through which a hydrogen off-gas discharged from the fuel cell passes;
an exhaust and drain valve disposed in the hydrogen discharge flow path; and
a controller programmed to control the supply amount of a hydrogen gas from the hydrogen supply unit,
wherein the hydrogen supply unit comprises:
a fuel tank in which the hydrogen gas is stored;
an injector provided in the hydrogen supply flow path; and
a circulation flow path which returns the hydrogen off-gas, which has been discharged from the fuel cell, from the hydrogen discharge flow path to the hydrogen supply flow path,
wherein when the fuel cell does not perform the power generation operation, the controller is further programmed to:

supply hydrogen gas to the fuel cell to set a flow volume of a fluid in an anode flow path at an outlet of an anode of the fuel cell to a first flow volume;

thereafter, supply hydrogen gas to the fuel cell to set the flow volume of the fluid in the anode flow path at the outlet of the anode to a second flow volume, which is smaller than the first flow volume;

open the exhaust and drain valve while the fluid is being passed at the second flow volume, thereby discharging water in the circulation flow path; and perform an opening/closing operation of the injector with the exhaust and drain valve opened, thereby increasing the gas pressure in pulses and discharging water.

3. The fuel cell system according to claim 2, wherein a maximum flow volume when performing the opening/closing operation of the injector is smaller than the first flow volume.

4. The fuel cell system according to claim 1, wherein the controller is configured to carry out an exhaust of the flow path on the anode side in the case where the controller determines that a temperature of a constituent component of the fuel cell system will decrease to zero degrees Celsius.

5. The fuel cell system according to claim 4, wherein the constituent component is the exhaust and drain valve.

6. A method for discharging a fluid in a fuel cell system out of the fuel cell system when a fuel cell of the fuel cell system does not perform a power generation operation, the method being executed by a controller of the fuel cell system, wherein the fuel cell system comprises:

the fuel cell;

a fuel tank storing a hydrogen gas to be supplied to the fuel cell;

a hydrogen supply flow path, through which the hydrogen gas to be supplied from the fuel tank to the fuel cell passes;

a circulation flow path which returns a hydrogen off-gas discharged from the fuel cell to the hydrogen supply flow path;

a hydrogen pump which pressure-feeds the hydrogen off-gas in the circulation flow path to the hydrogen supply flow path;

a gas-liquid separator disposed in the circulation flow path;

an exhaust and drain valve provided in the gas-liquid separator; and the controller which is programmed to control the hydrogen pump, the method comprising the steps of:

passing a fluid existing in a flow path on an anode side in the fuel cell at a first flow volume by supplying hydrogen gas to the fuel cell with the hydrogen pump;

setting the flow volume of the fluid in the anode flow path at an outlet of the anode to a third flow volume, which is smaller than the first flow volume, by supplying hydrogen gas to the fuel cell with the hydrogen pump after the fluid passes through the anode flow path at the first flow volume;

driving the hydrogen pump to supply hydrogen gas to the fuel cell until the fluid is not drained at the third flow volume of the fluid in the anode flow path at the outlet of the anode;

thereafter, passing the fluid at a second flow volume which is smaller than the first flow volume and the third flow volume by supplying hydrogen gas to the fuel cell with the hydrogen pump; and opening the exhaust and drain valve while the fluid is being passed at the second flow volume, thereby discharging water in the circulation flow path.

7. The method for discharging a fluid in a fuel cell system out of the fuel cell system according to claim 6, further comprising the step of:

carrying out an exhaust of the flow path on the anode side in the case where the controller determines that a temperature of a constituent component of the fuel cell system will decrease to zero degrees Celsius.

8. A method for discharging a fluid in a fuel cell system out of the fuel cell system when a fuel cell of the fuel cell system does not perform a power generation operation, the method being executed by a controller of the fuel cell system, wherein the fuel cell system comprises:

the fuel cell;

a fuel tank storing a hydrogen gas to be supplied to the fuel cell;

a hydrogen supply flow path, through which the hydrogen gas to be supplied from the fuel tank to the fuel cell passes;

an injector provided in the hydrogen supply flow path;

a circulation flow path which returns a hydrogen off-gas discharged from the fuel cell to the hydrogen supply flow path;

a gas-liquid separator disposed in the circulation flow path;

an exhaust and drain valve provided in the gas-liquid separator; and the controller which is programmed to control the injector, the method comprising the steps of:

supplying hydrogen gas to the fuel cell to pass a fluid existing in a flow path on an anode side in the fuel cell at a first flow volume;

thereafter, supplying hydrogen gas to the fuel cell to pass the fluid at a second flow volume which is smaller than the first flow volume;

opening the exhaust and drain valve while the fluid is being passed at the second flow volume, thereby discharging water in the circulation flow path; and performing an opening/closing operation of the injector with the exhaust and drain valve opened, thereby increasing the gas pressure in pulses and discharging water.

9. The fuel cell system according to claim 1, wherein the controller is programmed to:

set the flow volume of the fluid in the anode flow path at the outlet of the anode of the fuel cell to the first flow volume for a first predetermined period of time; and set the flow volume of the fluid in the anode flow path at the outlet of the anode to the third flow volume for a second predetermined period of time, wherein the fluid is not drained at the third flow volume at the end of the second predetermined period of time.

10. The fuel cell system according to claim 2, wherein the controller is programmed to set the flow volume of the fluid in the anode flow path at the outlet of the anode of the fuel cell to the first flow volume for a predetermined period of time.

11. The fuel cell system according to claim 2, wherein the controller is programmed to increase the flow volume of the fluid in the anode flow path at the outlet of the anode until the first flow volume is reached.

12. The method for discharging a fluid in a fuel cell system out of the fuel cell system according to claim 6, further comprising:

passing the fluid existing in the flow path on the anode side in the fuel cell at the first flow volume by the hydrogen pump for a first predetermined period of time; and setting the flow volume of the fluid in the anode flow path at the outlet of the anode to the third flow volume by the hydrogen pump for a second predetermined period of time, wherein the fluid is not drained at the third flow volume of the fluid in the anode flow path at the outlet of the anode at the end of the second predetermined period of time.

13. The method for discharging a fluid in a fuel cell system out of the fuel cell system according to claim 8, further comprising passing the fluid existing in the flow path on the anode side in the fuel cell at the first flow volume for a predetermined period of time.

14. The method for discharging a fluid in a fuel cell system out of the fuel cell system according to claim 8, further comprising increasing the flow volume of the fluid in the anode flow path at the outlet of the anode until the first flow volume is reached.

* * * * *